United States Patent [19]

Norimatsu

[11] Patent Number: 5,615,248
[45] Date of Patent: Mar. 25, 1997

[54] TELEPHONE APPARATUS HAVING AUTOMATIC DISPLAY FUNCTION

[75] Inventor: Noriko Norimatsu, Tokyo, Japan

[73] Assignee: NEC Corporation, Tokyo, Japan

[21] Appl. No.: 324,464

[22] Filed: Oct. 17, 1994

Related U.S. Application Data

[63] Continuation of Ser. No. 6,309, Jan. 22, 1993, abandoned.

[30] Foreign Application Priority Data

Jan. 23, 1992 [JP] Japan ..................... 4-032693

[51] Int. Cl.⁶ .................................. H04Q 7/32
[52] U.S. Cl. ................................. 379/58; 455/89
[58] Field of Search ........................ 379/58, 59, 61, 379/354, 355; 455/33.1, 54.1, 89

[56] References Cited

U.S. PATENT DOCUMENTS

| | | | |
|---|---|---|---|
| 4,481,382 | 11/1984 | Villa-Real | 179/90 |
| 4,726,059 | 2/1988 | Havel | 379/354 |
| 4,734,928 | 3/1988 | Weiner et al. | 379/63 |
| 5,020,091 | 5/1991 | Krolopp et al. | 379/58 |
| 5,021,889 | 6/1991 | Yamamoto | 358/440 |
| 5,067,150 | 11/1991 | Satomi et al. | 379/354 |
| 5,095,503 | 3/1992 | Kowalski | 379/354 |
| 5,117,449 | 5/1992 | Metroka et al. | 379/58 |
| 5,134,717 | 7/1992 | Rasmussen | 379/354 |
| 5,155,759 | 10/1992 | Saegusa et al. | 379/61 |
| 5,157,719 | 10/1992 | Waldman | 379/356 |
| 5,216,709 | 6/1993 | Wen et al. | 379/354 |
| 5,218,629 | 6/1993 | Dumond, Jr. et al. | 379/359 |
| 5,222,127 | 6/1993 | Fukui | 379/58 |
| 5,448,622 | 9/1995 | Huttuna | 379/58 |

FOREIGN PATENT DOCUMENTS

| | | | |
|---|---|---|---|
| 499211 | 8/1992 | European Pat. Off. | |
| 62-219868 | 9/1987 | Japan . | |
| 0204535 | 8/1989 | Japan | 379/61 |
| 3-201834 | 9/1991 | Japan . | |
| 3-231524 | 10/1991 | Japan . | |
| WO91/12698 | 8/1991 | WIPO . | |

OTHER PUBLICATIONS

Patent Abstracts of Japan, vol. 12, No. 85 (E–591), Mar., 1988.
Patent Abstracts of Japan, vol. 15, No. 465 (E1138), Nov. 1991.
Patent Abstracts of Japan, vol. 16, No. 11 (E–1153), Jan. 1992.
"The GSM System for Mobile Communications" Mouly et al, 1992, pp. 520–521.
"Motorola User Manual" Motorola Pan American Cellular Subscriber Group, pp. 12–13, 1993.

*Primary Examiner*—Curtis Kuntz
*Assistant Examiner*—William G. Trost
*Attorney, Agent, or Firm*—Foley & Lardner

[57] ABSTRACT

In a mobile telephone apparatus, a currently-used telephone number is stored, and a display mode corresponding to a part of the currently-used telephone number is displayed.

9 Claims, 5 Drawing Sheets

Fig. 2

| CODE | GEOGRAPHICAL AREA |
|---|---|
| 234 | U.K. |
| 272 | IRELAND |
| 278 | MALTA |
| 232 | AUSTRIA |
| 222 | ITALY |
| 214 | SPAIN |

Fig. 4A

VODAFONE

Fig. 4B

Cellnet

Fig. 4C

Service-A

Fig. 4D

Service-B

TELEPHONE APPARATUS HAVING AUTOMATIC DISPLAY FUNCTION

This application is a continuation of application Ser. No. 08/006,309, filed Jan. 22, 1993, now abandoned.

BACKGROUND OF THE INVENTION

1. Field of the Invention

The present invention relates to a mobile telephone apparatus such as an automobile telephone apparatus or a portable telephone apparatus, and more particularly, to the improvement of a display system of the mobile telephone apparatus.

2. Description of the Related Art

Generally, the hardware of a mobile telephone apparatus may be used commonly in various geographical areas or countries such as the United Kingdom, Ireland, Malta, Austria, Italy and Spain.

In a prior art mobile telephone apparatus, a single program is incorporated for displaying messages in a display unit, and as a result, the language and contents of the displayed messages are fixed for a specific area (country). Therefore, if this prior art mobile telephone apparatus is to be used in another country, it is necessary to exchange the program with another program, i.e., to exchange a read-only memory (ROM) with another one even when the telephone apparatus incorporates a plurality of telephone numbers for a plurality of countries.

Also, in another prior art mobile telephone apparatus which incorporates a plurality of programs to provide a plurality of display modes for a plurality of countries, it is necessary to select one of the display modes in advance.

SUMMARY OF THE INVENTION

It is an object of the present invention to provide a method and mobile telephone apparatus for automatically displaying messages whose language and contents are determined in accordance with a geographical area or country in which the mobile telephone apparatus is currently being used.

According to the present invention, in a mobile telephone apparatus, a currently-used telephone number is stored, and a display mode corresponding to a part of the currently-used telephone number is displayed.

BRIEF DESCRIPTION OF THE DRAWINGS

The present invention will be more clearly understood from the description as set forth below with reference to the accompanying drawings, wherein:

FIG. 2 is a diagram showing an example of the correspondence table of FIG. 1;

FIGS. 4A, 4B, 4C and 4D are diagrams showing display examples of the display unit of FIG. 1.

DESCRIPTION OF THE PREFERRED EMBODIMENTS

Figure 1:
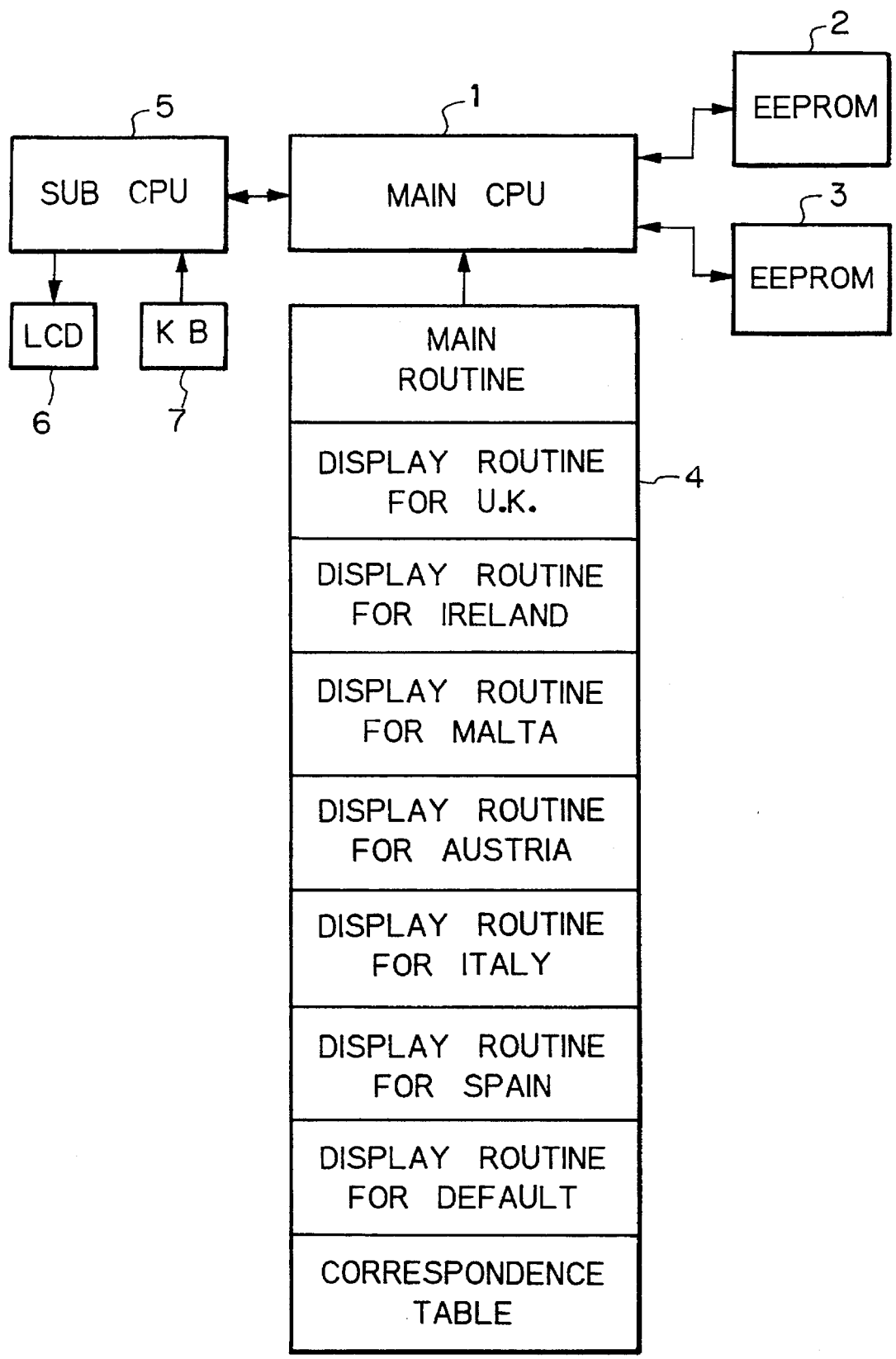
FIG. 1 is a block circuit diagram illustrating an embodiment of the mobile telephone apparatus according to the present invention.

In FIG. 1, which illustrates an embodiment of the present invention, reference numeral 1 designates a main central processing unit (CPU) for accessing nonvolatile memories such as EEPROM's 2 and 3 for storing telephone numbers and a ROM 4 for storing programs and fixed data. The EEPROM 2 stores one or more telephone numbers specialized for one or more countries, and the EEPROM 3 stores a currently-used telephone number selected from the EEPROM 2. The content of the EEPROM 2 is preset by telephone service operator companies or the like, and the content of the EEPROM 3 is set by a user of the mobile telephone apparatus.

Stored in the ROM 4 are a main routine (program), a display routine for the United Kingdom, a display routine for Ireland, a display routine for Malta, a display routine for Austria, a display routine for Italy, a display routine for Spain, a display routine for a default mode, and a correspondence table between the six geographical areas (countries) and the three most significant digits (MSD's) of telephone numbers. Note that, generally in Europe, a telephone number for a mobile telephone number is formed by ten digits whose three MSD's correspond to codes in conformity with the International Telegraph and Telephone Consultative Committee (CCITT), as shown in FIG. 2. Note also that the content of the EEPROM 2 is preset by telephone service operator companies or the like simultaneously with the presetting of the EEPROM 2.

Also, in FIG. 1, reference numeral 5 designates a sub CPU for accessing a display unit such as a liquid crystal device (LCD) 6 and a keyboard 7.

In the mobile telephone apparatus of FIG. 1, an area name (country name) is identified from the currently-used telephone number stored in the EFPROM 3 using the correspondence table stored in the ROM 4, to thereby automatically switch the display mode to the identified area (country).

The operation of the main CPU 1 will now be explained with reference to FIGS. 3A, 3B and 3C which show the main routine stored in the ROM 4.

Figure 3A:
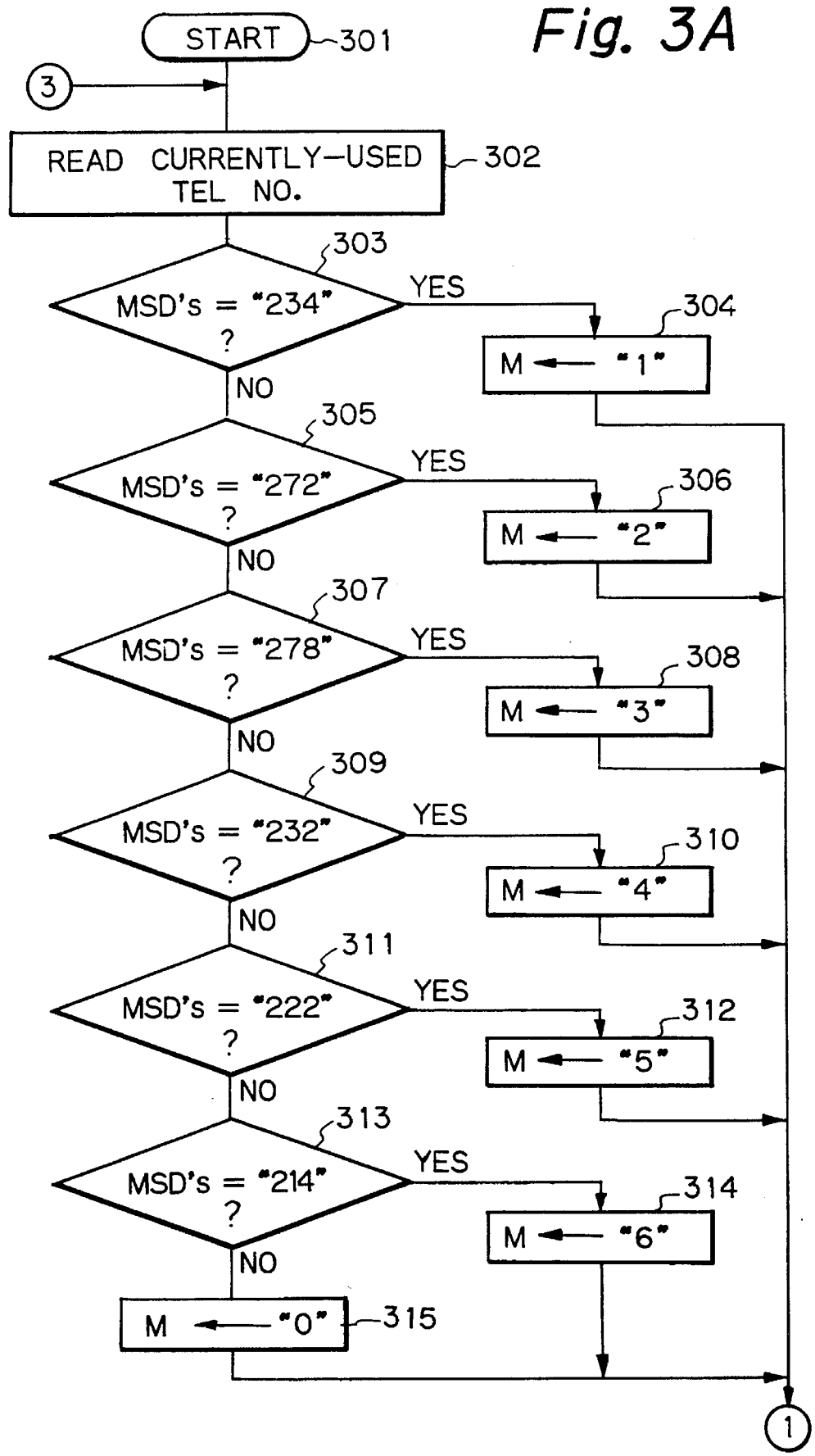
FIGS. 3A, 3B and 3C are flowcharts showing the operation of the main CPU of FIG. 1.
Figure 3B:
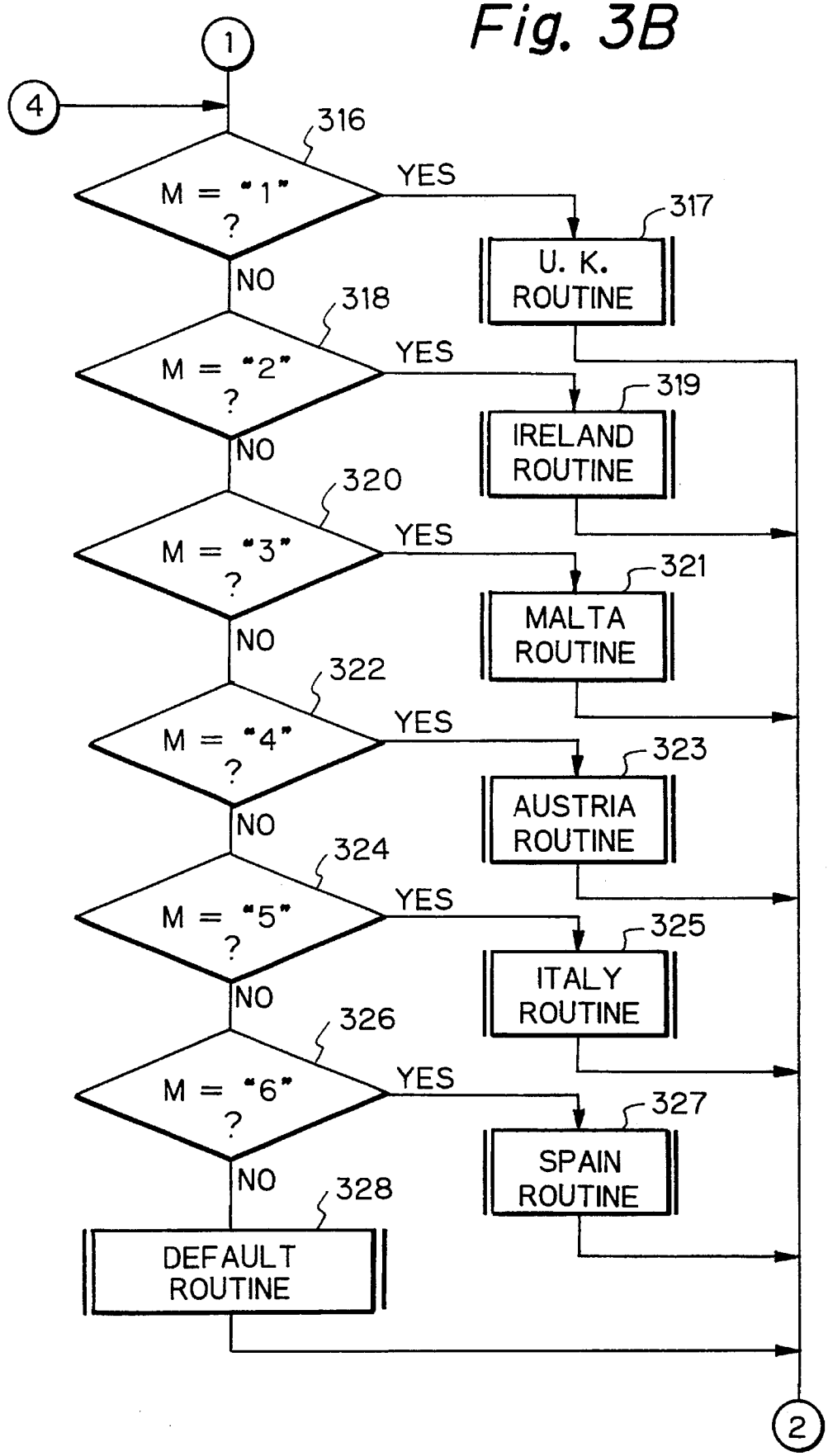
Figure 3C:
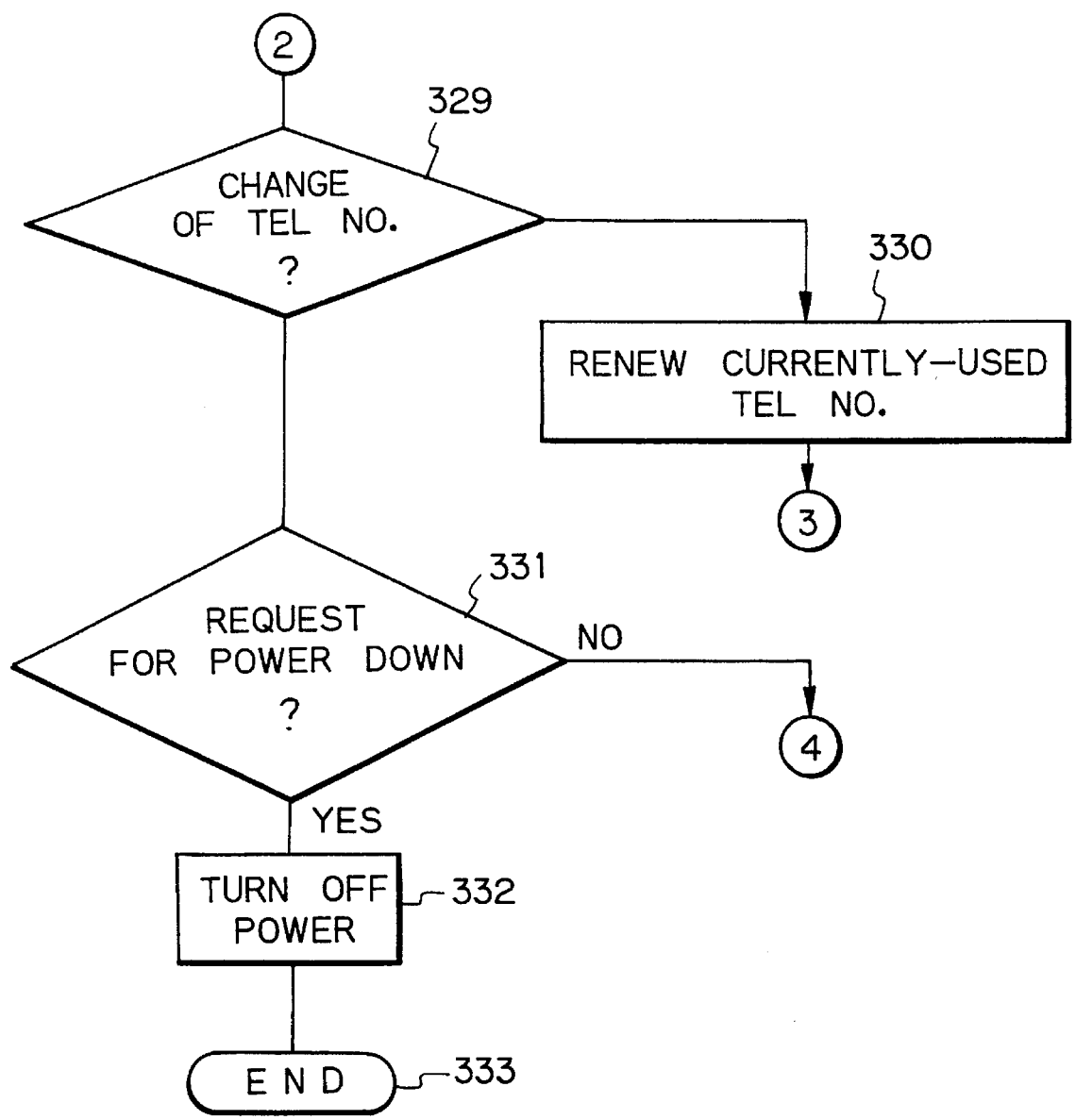

When the mobile telephone apparatus is powered ON, the routine of FIGS. 3A, 3B and 3C is started by step 301 of FIG. 3A. Then, at step 302, the main CPU 1 reads a currently-used telephone number out of the EEPROM 3, and at step 303, it is determined whether or not the three MSD's of the telephone number are "234" (United Kingdom code). As a result, if the three MSD's are "234", the control proceeds to step 304 which causes a display mode number M to be "1". Otherwise, the control proceeds to step 305. At step 305, it is determined whether or not the three MSD's of the telephone number are "272" (Ireland code). As a result, if the three MSD's are "272", the control proceeds to step 306 which causes the display mode number M to be "2". Otherwise, the control proceeds to step 307. At step 307, it is determined whether or not the three MSD's of the telephone number are "278" (Malta code). As a result, if the three MSD's are "278", the control proceeds to step 308 which causes the display mode number M to be "3". Otherwise, the control proceeds to step 309. At step 309, it is determined whether or not the three MSD's of the telephone number are "232" (Austria code). As a result, if the three MSD's are "232", the control proceeds to step 310 which causes the display mode number M to be "4". Otherwise, the control proceeds to step 311. At step 311, it is determined whether or not the three MSD's of the telephone number are "222" (Italy code). As a result, if the three MSD's are "222", the control proceeds to step 312 which causes the display mode number M to be "5". Otherwise, the control proceeds to step 313. At step 313, it is determined whether or not the three MSD's of the telephone number are "214" (Spain code). As a result, if the three MSD's are "214", the control proceeds to step 314 which causes the display mode number M to be "6". Otherwise, the control proceeds to step 315 which causes the display mode number M to be "0" for a default mode.

The control at step 304, 306, 308, 310, 312, 314 or 315 proceeds to step 316 of FIG. 3B. At step 316, it is determined whether or not the display mode number M is "1". As a result, if M equals "1", the control proceeds to step 317 which initiates the United Kingdom display routine. In the United Kingdom display routine, for example, the main CPU 1 transmits a serial display data "VODAFONE" or "Cellnet" to the sub CPU 5, thereby displaying the data "VODAFONE" or "Cellnet" as shown in FIG. 4A or 4B. Note that "VODAFONE" and "Cellnet" are names of United Kingdom service operator companies. Otherwise, the control proceeds to step 318. At step 318, it is determined whether or not the display mode number M is "2". As a result, if M equals "2", the control proceeds to step 319 which initiates the Ireland display routine. In the Ireland display routine, the main CPU 1 transmits a serial display data of an Irish service operator company. Otherwise, the control proceeds to step 320. At step 320, it is determined whether or not the display mode number M is "3". As a result, if M equals "3", the control proceeds to step 321 which initiates the Malta display routine. In the Malta display routine, the main CPU 1 transmits a serial display data of a Malta service operator company. Otherwise, the control proceeds to step 322. At step 322, it is determined whether or not the display mode number M is "4". As a result, if M equals "4", the control proceeds to step 323 which initiates the Austrian display routine. In the Austrian display routine, the main CPU 1 transmits a serial display data of an Austrian service operator company. Otherwise, the control proceeds to step 324. At step 324, it is determined whether or not the display mode number M is "5". As a result, if M equals "5", the control proceeds to step 325 which initiates the Italian display routine. In the Italian display routine, the main CPU 1 transmits a serial display data of an Italian service operator company. Otherwise, the control proceeds to step 326. At step 326, it is determined whether or not the display mode number M is "6". As a result, if M equals "6", the control proceeds to step 327 which initiates the Spanish display routine. In the Spanish display routine, the main CPU 1 transmits a serial display data of a Spanish service operator company. Otherwise, since the currently-used telephone number is not located in the correspondence table, the control proceeds to step 328 which initiates the default display routine. In the default display routine, for example, the main CPU 1 transmits a serial display data "Service-A" or "Service-B" to the sub CPU 5, thereby displaying the data "Service-A" or "Service-B" as shown in FIG. 4C or 4D.

The control at step 317, 319, 321, 323, 325, 327 or 328 proceeds to step 329 of FIG. 3C.

At step 329, the main CPU 1 determines whether or not key input data from the keyboard 7 requesting a change of the currently-used telephone number is received by the sub CPU 5. As a result, if such key input data is received by the sub CPU 5, the control proceeds to step 330 which renews the currently-used telephone number in the EEPROM 3. In other words, the main CPU 1 selects another of the preset telephone numbers in the EEPROM 2 and writes it into the EEPROM 3. Then, the control is returned to step 302 of FIG. 3A.

The above-described process is repeated by step 331 until a request for a power-OFF of the mobile telephone apparatus occurs. That is, when such a request occurs, the control proceeds to step 332 which turns OFF the power to the mobile telephone apparatus. Then, this main routine is completed by step 333.

In the above-described embodiment, although a mobile telephone apparatus used in Europe is exemplified, it is clear that the present invention can be applied to other areas or countries. Also, a larger number of kinds of display routines (programs) can be stored in the ROM 4.

As explained hereinbefore, according to the present invention, a geographical area (or country) is identified in accordance with a currently-used telephone number, to automatically switch the display mode, thereby displaying the current area or country based on the currently-used telephone number.

I claim:

1. A displaying method for a mobile telephone apparatus, comprising the steps of:

storing a plurality of telephone numbers assigned to said mobile telephone apparatus;

receiving an input from a user to select one of the plurality of telephone numbers as a currently assigned telephone number;

storing the selected one of the telephone numbers as the currently assigned telephone number for the mobile telephone apparatus;

comparing a most significant number of digits of the currently assigned telephone number with a comparable number of digits of a first of a plurality of numbers stored in a first memory within the mobile telephone apparatus;

if a successful comparison is made with the first of the plurality of numbers stored in the first memory displaying data in accordance with a part of the currently assigned telephone number, wherein said part of the currently assigned telephone number indicates a particular geographical area, wherein the data is displayed based also on information retrieved using the first of the plurality of numbers stored in the first memory;

if a successful comparison is not made with the first of the plurality of numbers stored in the first memory, comparing the most significant number of digits of the currently assigned telephone number with a comparable number of digits of a next of the plurality of numbers stored in the first memory within the mobile telephone apparatus; and if a successful comparison is made with the second of the plurality of numbers stored in the first memory, displaying data in accordance with a part of the currently assigned telephone number and on information retrieved using the next of the plurality of numbers stored in the first memory.

2. A method as set forth in claim 1, further comprising the steps of:

storing a plurality of display modes; and selecting one of the plurality of display modes in accordance with the part of the currently assigned telephone number, said data displaying step displaying the data in accordance with the selected display mode.

3. A method as set forth in claim 1, further comprising the steps of:

storing a plurality of display modes each corresponding to one of a plurality of predetermined geographical areas; and determining what predetermined geographical area said telephone apparatus is located in in accordance with the part of the currently assigned telephone number, said data displaying step displaying one of the display modes corresponding to the determined geographical area.

4. A method as set forth in claim 3, wherein, when said geographical area determining step determines that said telephone apparatus is not located in any of said predetermined geographical areas, said data displaying step displays a default mode.

5. A mobile telephone apparatus comprising:

means for storing a plurality of telephone numbers allocated to said mobile telephone apparatus;

means for receiving an input from a user to select one of the plurality of telephone numbers as a currently assigned telephone number;

means for storing the selected one of the telephone numbers as the currently assigned telephone number for the mobile telephone apparatus; and means for displaying data in accordance with a part of the currently assigned telephone number, wherein said part of the currently assigned telephone number indicates a particular geographical area, wherein said displaying means displays the data based on comparing a most significant number of digits of the currently assigned telephone number with a comparable number of digits of a plurality of numbers stored in the storing means for storing the plurality of numbers the comparing being done between the currently assigned telephone number add the plurality of numbers in a predetermined order;

wherein if a successful comparison is made with one of the plurality of numbers, the comparing stops and the data that is displayed is retrieved from the storing means for storing the plurality of numbers based on the comparable number of digits of the one of the plurality of numbers, and wherein the displaying means automatically displays the data based only on the input from the user to select the one of the plurality of telephone numbers without any more inputs required from the user.

6. A mobile telephone apparatus as set forth in claim 5, further comprising:

means for storing a plurality of display modes; and means for selecting one of the plurality of display modes in accordance with the part of the currently assigned telephone number, said data displaying means displaying the data in accordance with the selected display mode.

7. A mobile telephone apparatus as set forth in claim 5, further comprising:

means for storing a plurality of display modes each corresponding to one of a plurality of predetermined geographical areas; and means for determining what predetermined geographical area said telephone apparatus is located in in accordance with the part of the currently assigned telephone number, said data displaying means displaying one of the display modes corresponding to the determined geographical area.

8. A mobile telephone apparatus as set forth in claim 7, wherein, when said geographical area determining means determines that said telephone apparatus is not located in any of said predetermined geographical areas, said data displaying means displays a default mode.

9. A displaying method for a mobile telephone apparatus, comprising the steps of:

a) storing a plurality of telephone numbers in a first memory of said mobile telephone apparatus;

b) displaying said plurality of telephone numbers stored in said first memory of said mobile telephone apparatus;

c) receiving a user-selected choice of one of said plurality of telephone numbers as a user-selected telephone number for said mobile telephone apparatus;

d) storing said user-selected telephone number in a second memory in said mobile telephone apparatus; and e) displaying data in accordance with said user-selected telephone number, wherein said data displayed in step e) includes a name of a telephone system that said user-selected telephone number is assigned to, wherein said data displayed in step e) further includes a geographical location of the telephone system that said user-selected telephone number is assigned to, wherein the data displayed in step e) is determined based on comparing a most significant number of digits of the user-selected telephone number with a comparable number of digits of a plurality of numbers stored in a third memory, the comparing being done between the user-selected telephone number and the plurality of numbers in a particular order, and wherein if a successful comparison is made with one of the plurality of numbers, the comparing stops and the data displayed in step e) is retrieved from a fourth memory based on the comparable number of digits of one of the plurality of numbers that corresponds to the successful comparison made with the most significant number of digits.

* * * * *